CORE MATRIX CONTROL CIRCUIT FOR SELECTION OF CORES BY TRUE AND COMPLEMENT SIGNALS

Filed June 8, 1959

3 Sheets-Sheet 1

INVENTORS
ROBERT J. FLAHERTY
RICHARD C. LAMY

BY Darby & Darby

ATTORNEYS

INVENTORS
ROBERT J. FLAHERTY
RICHARD C. LAMY
BY
Darby & Darby
ATTORNEYS

Nov. 2, 1965 R. J. FLAHERTY ETAL 3,215,982

CORE MATRIX CONTROL CIRCUIT FOR SELECTION OF CORES BY TRUE AND COMPLEMENT SIGNALS

Filed June 8, 1959 3 Sheets-Sheet 3

INVENTORS
ROBERT J. FLAHERTY
RICHARD C. LAMY

BY Darby & Darby

ATTORNEYS

United States Patent Office 3,215,982
Patented Nov. 2, 1965

3,215,982

CORE MATRIX CONTROL CIRCUIT FOR SELECTION OF CORES BY TRUE AND COMPLEMENT SIGNALS

Robert J. Flaherty, Pleasant Valley, and Richard C. Lamy, Poughkeepsie, N.Y., assignors to International Business Machines Corporation, New York, N.Y., a corporation of New York Filed June 8, 1959, Ser. No. 818,864
6 Claims. (Cl. 340—147)

This invention relates to computer logical circuits and more particularly to a decoder for use with a load sharing matrix switch.

In the application of Gregory Constantine, Jr., Serial No. 745,395, filed on June 30, 1958, now U.S. Patent No. 3,126,528, and assigned to the assignee of this application, a load sharing matrix switch was described. This switch had a number of drivers which were connected to operate on a load-sharing basis and were used to select, i.e. read out of or write into, a single memory core from a memory matrix. The selection was accomplished in a manner such that undesired, spurious noise signals from the unselected cores were minimized.

Briefly described, the matrix switch has a plurality of magnetic cores, with each core having a plurality of windings inductively coupled to it. These windings are arranged in a predetermined winding pattern, so that a single core may be selected by applying driver current coincidentally to selected windings, associated with the core to be selected, in a predetermined combinatorial pattern. The driver current is supplied to each of the selected windings by a separate driver device, and since a number of coincidentally occurring driver pulses is necessary to select any one core, the matrix switch operates on a load sharing basis.

By applying driver current of one sense coincidentally in the predetermined combinatorial pattern, it is possible to perform one operation of a memory cycle on a selected core, such as reading out the binary information stored in that core. The performance of another operation on the selected core during the memory cycle, i.e. to reset it or write into it, may be accomplished by connecting another driver, which is capable of supplying current of the opposite sense, to the windings with the same predetermined combinatorial pattern. In another arrangement, a second set of windings, called the complementary windings, may be provided which are wound in the opposite sense to the first set, which are called the normal windings. In this arrangement, a plurality of driver pairs are provided. One driver of each pair is connected to a normal winding and the other driver of the pair is connected to a complementary winding. By energizing certain ones of the two sets of windings in a predetermined combinatorial pattern, a particular core may be selected and a read operation performed. By selecting and energizing the windings of the sets in a complementary combinatorial pattern, a write operation is performed on the same core. In this manner, the load sharing switch performs different operations of a memory cycle on a selected core by the use of certain ones of the drivers of each driver pair for one operation and the other driver of the driver pairs for the other operation.

The selected windings of the selected core of the matrix switch are wound in such a manner so that the magnetic effect thereon, due to the currents in the selected windings, is additive to produce excitation of the selected core, while the windings are wound on the remaining, unselected cores in such a manner so that the magnetic effect produced thereon, due to currents in the selected windings, is cancelled and produces no excitation of any of the unselected ocres. In this manner, the spurious noise output in minimized, thereby eliminating the furnishing of power by the drivers which performs no useful work and also eliminating the possibility of the spurious noise generated in an unselected winding of the memory from switching unselected groups of memory cores and destroying their stored information, or producing incorrect outputs from the memory.

In operating matrix switches of the load sharing type, for example, the one described above, it is necessary that a decoder be provided which is capable of selecting the proper drivers for applying drive current to the windings, also called drive wires, of the matrix switch in the proper combinatorial pattern so that the desired core of the switch may be selected for either a read or a write operation. A suitable decoder for a load sharing matrix switch is formed by the necessary logic circuits for selecting the proper drivers. These decoder logic circuits operate in response to an address which is supplied from some external source, which serves to determine the desired core to be selected.

It is therefore an object of the invention to provide a decoder for a load sharing matrix switch.

Yet another object of this invention is to provide a decoder for a load sharing matrix switch which selects one half of the total drivers during one operation of a memory cycle and the other half of the drivers during another operation of the memory cycle.

It is another object of this invention to provide a decoder for a load sharing matrix switch which is capable of selecting the appropriate driver from a plurality of driver pairs during one operation and selecting the other driver of the driver pairs for another operation.

Still a further object of this invention is to provide a decoder for a matrix switch which is capable of producing a plurality of signals in response to one control signal and the complements of those signals in response to another control signal.

Yet another object of this invention is to provide a decoder for a matrix switch whose logical circuitry is operated in response to an external address.

A further object of this invention is to provide a decoder for a load sharing matrix switch which is capable of selecting a single magnetic core from a memory formed by a plurality of such cores.

Other objects of the invention will be pointed out in the following description and claims and illustrated in the accompanying drawings, which disclose, by way of examples, the principle of the invention and the best mode, which has been contemplated, of applying that principle.

In accordance with the objects of this invention and in a preferred embodiment thereof a decoder is provided which is capable of selecting the proper driver of each of a plurality of driver pairs of a load sharing matrix switch in order that coincident current pulses may be applied to the matrix switch for the purpose of selecting a single magnetic memory core from the matrix switch for one operation of a memory cycle. In the present invention, this is accomplished by the use of logical circuits which operate in response to a binary address to generate a number of signals which are used to energize selected drivers of the matrix switch and cause the selected drivers to produce drive current pulses. Each driver has a winding connected to it which is coupled to all of the cores in the matrix switch. In order to select the desired core of the matrix switch for a read operation, a control signal is produced so that the signals generated by the logic circuits energize one of the drivers of each of the driver pairs in a predetermined combinatorial pattern and apply coincidentally occurring current pulses to the windings connected to these drivers. The windings which receive the current pulses are coupled to the selected core so that the magnetomotive forces produced by the currents add in a manner to switch the core for a read operation. When the same core is to be used for a write operation, a second control signal is produced so that the signals generated by the logic circuits serve to energize the other driver of each of the driver pairs and thereby apply pulses of current to the windings connected to those drivers. These windings are coupled to the selected core in a manner such that the magnetomotive forces produced by the coincidentally occurring current pulses add and perform a write operation. Each core may therefore be selected for one operation of a memory cycle by energizing certain ones of the drivers of each of the driver pairs in response to a first control signal and may be selected for another operation by energizing the complementary driver of each of the pairs in response to a second control signal.

Figure 1:
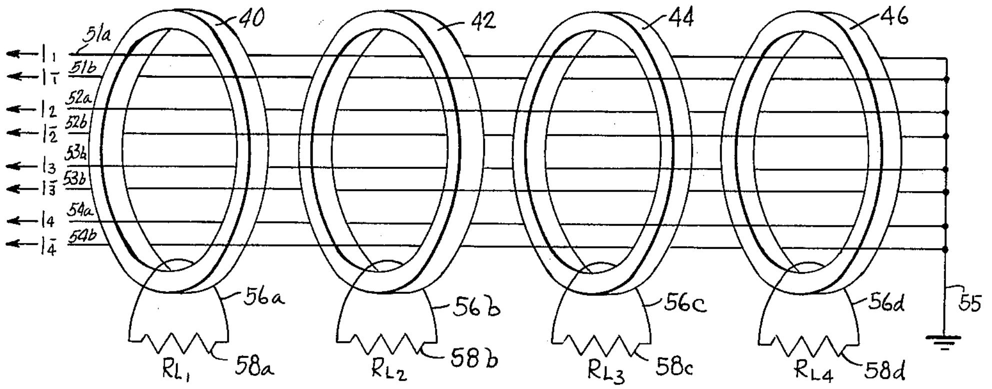
FIG. 1 is a diagrammatic representation of a matrix switch having four magnetic cores, which is used to illustrate the principles of operation of this invention.

In order to explain the principles of the invention, reference is made to FIG. 1 which shows a load sharing matrix switch having four magnetic cores, 40, 42, 44, and 46. While the cores are shown as toroidal in shape, it should be realized that other suitable shapes may be used. Four pairs of input windings 51, 52, 53, and 54, are wound through each of the cores, 40, 42, 44, and 46. Each of the pairs of windings, 51, 52, 53, and 54, passes through each of the cores and each wire of each pair is wound in an opposite sense through each core. For explanatory purposes, each winding designated by "*a*," i.e. 51*a*, 52*a*, 53*a*, and 54*a*, is called the normal winding of the pair while each winding designated by "*b*," i.e. 51*b*, 52*b*, 53*b*, and 54*b*, is called the complementary winding of the pair. Each of the normal and complementary windings of the winding pairs, 51, 52, 53, and 54, is connected to a driver (not shown) which supplies the drive current to the winding. These drivers may be any suitable vacuum tube, transistor, etc., which is arranged in a circuit configuration suitable for producing the required driver pulses. For the purposes of illustration, the current pulses from each of the drivers are considered as positive in nature, although pulses of the opposite sense may be used.

Each of the cores, 40, 42, 44, and 46, also has an output winding 56, which is connected to a row or column winding of the memory, represented by the resistor load 58. As is well known, magnetic cores possess two stable states of magnetism which are opposite in sense and consequently, a magnetic core may be used as a binary storage element. One of the stable states represents the binary digit 1 and the opposite stable state represents the binary digit 0. In order to cause a magnetic core to assume one of its two stable states, a drive current pulse is applied to the windings passing through the core of a magnitude and sense sufficient to generate a magnetomotive force capable of changing the state of the core. These effects are believed to be well known in the art and require no further description. As a result of one core being switched from one state to another, a pulse is induced in its output winding 56, which may be utilized to perform another function along the row or column line of the magnetic memory to which the output winding is connected.

The principle of the load sharing magnetic switch is to combine the magnetomotive forces generated by the currents of several drivers so that the combined magnetomotive force has a value equal to that generated by the current which would normally be applied from a single driver. Consequently, each driver need only furnish a fraction of the current required to change the state of the magnetic core. Thus, the unit of current provided by each driver generates a unit of magnetomotive force $H_u$ which is equal to $H_t/N$, where $H_t$ is the total magnetomotive force required to drive the core from one state to another, and N is the number of drivers applying drive currents to the core.

In applying the principle of load sharing, N pairs of windings are inductively coupled to a core, with one winding of each pair passing through the core in a sense called the "1 sense," such that a current pulse would contribute to switching the core from the 0 to the 1 state, and the other winding of the pair being wound through the core in a sense, called the "0 sense," such that a current pulse would contribute to switching the core from a 1 to a 0 state. Consquently, N windings pass through each core in the 1 sense and N windings pass through each core in the 0 sense. Hence, during read time of a memory cycle, by applying drive current pulses coincidentally to the N windings of the core to be selected which are wound therethrough in the "1 sense," N units of magnetomotive force $H_u$ are combined to drive the core, which is in the 0 state, to the 1 state. The change in flux, when the core is switched from the 0 state to the 1 state, produces an output pulse in the output winding of the core which may be used as a read drive pulse, or to select a column or row winding of a memory. Likewise, during write time of a memory cycle, by applying drive current pulses coincidentally to the "0 sense" windings, N units of magnetomotive force $H_u$ are combined to drive a core which is in the 1 state, to the 0 state. The change in flux, when the core switches from the 1 state to the 0 state, induces a pulse in the output winding of the core equal in magnitude but opposite in sense to that of the first mentioned output pulse. This output pulse may be used as a write drive pulse for the selected column or row winding of memory.

Referring again to FIG. 1, the normal windings, those designated by the "*a*," are wound through the cores, 40, 42, 44, and 46, in a predetermined pattern of senses. For example, the sense of winding 53*a* as it passes through the four cores may be designated as 1, 1, 0, 0, i.e. a pulse of current applied to winding 53*a* would contribute to switching each of cores 40 and 42 from a 0 to a 1 state (read) and each of cores 44 and 46 from a 1 to a 0 state (write).

The sense patterns of the normal windings are shown as follows:

| | Cores | | | |
|---|---|---|---|---|
| | 40 | 42 | 44 | 46 |
| Windings: | | | | |
| 51a | 1 | 1 | 1 | 1 |
| 52a | 1 | 0 | 1 | 0 |
| 53a | 1 | 1 | 0 | 0 |
| 54a | 1 | 0 | 0 | 1 |

The complementary winding, designated by the "*b*," of each pair of windings is wound through the coil in the opposite sense. Therefore, the sense winding patterns of the complementary windings are as follows:

| | Cores | | | |
|---|---|---|---|---|
| | 40 | 42 | 44 | 46 |
| Windings: | | | | |
| 51b | 0 | 0 | 0 | 0 |
| 52b | 0 | 1 | 0 | 1 |
| 53e | 0 | 0 | 1 | 1 |
| 54b | 0 | 1 | 1 | 0 |

which is the complementary pattern of the sense winding pattern of the normal windings.

In order to select any one of the cores for a desired operation, i.e. read or write, it is necessary that the winding of that core which would contribute to the desired operation by supplying magnetomotive force in the proper sense to the core be energized with a current pulse. For example, if it is desired to perform a read operation on the core 40, the windings 51*a*, 52*a*, 53*a*, and 54*a*, all of the normal windings, are supplied with current from their respective drivers. These currents combine and cause the core 40 to switch from a 0 to a 1 state, if the core was originally in a 0 state. If the core 40 was originally in the 1 state, there would be no switching. In order to perform a write operation on the core 40, the windings 51*b*, 52*b*, 53*b*, and 54*b*, are supplied with current pulses through their respective drivers. These currents combine and cause the core 40 to switch from a 1 to a 0 state, if the core was in a 1 state.

In order to conveniently represent which of the windings is to be energized for a read or write operation, it is convenient to develop a selection code. This code may be developed by designating which winding of the pair passing through the core is supplied with driver current. This can conveniently be accomplished by designating a "1" as the condition when a normal winding passing through a core is supplied with driver current and a "0" when the complementary winding passing through a core is supplied with driver current. Using this code, the read and write operations for the core 40 may be written as follows:

| | | Winding Pair | | | |
|---|---|---|---|---|---|
| | | 51 | 52 | 53 | 54 |
| Core 40 | Read | 1 | 1 | 1 | 1 |
| | Write | 0 | 0 | 0 | 0 |

Similarly, the read and write operations for cores 42, 44, and 46 may be written as follows:

| | | Winding Pair | | | |
|---|---|---|---|---|---|
| | | 51 | 52 | 53 | 54 |
| Core 42 | Read | 1 | 0 | 1 | 0 |
| | Write | 0 | 1 | 0 | 1 |
| Core 44 | Read | 1 | 1 | 0 | 0 |
| | Write | 0 | 0 | 1 | 1 |
| Core 46 | Read | 1 | 0 | 0 | 1 |
| | Write | 0 | 1 | 1 | 0 |

It should be noted that the write pattern for the the selection of each core is the complement of the read pattern.

The selection wiring pattern for the magnetic switch is developed as follows. Table I shows the basic pattern for a two-core, two output magnetic switch.

*Table I*

| II | I |
|---|---|
| 1 | 1 |
| 1 | 0 |
| III | IV |

In the pattern shown in Table I, each column represents the winding selected and energized for a read pulse and each row represents the sense of the normal winding of a pair of windings as it is wound through the particular coil. The basic pattern shown above represents a switch which has two input pairs and a number of outputs $N=2$. This pattern may be expanded most conveniently to provide for larger size magnetic switches by doubling the size each time and repeating the previous pattern in quadrants I, II, and III and complementing the pattern in quadrant IV. This generalized expansion is shown below in Table II.

*Table II*

| II | I |
|---|---|
| N output selection pattern | N output selection pattern |
| III | IV |
| N output selection pattern | Complement of the N output selection pattern |

Consequently, the basic pattern may be expanded for the read pattern of the four output magnetic switch of FIG. 1, as shown below in Table III:

*Table III*

| II | | I | |
|---|---|---|---|
| 1 | 1 | 1 | 1 |
| 1 | 0 | 1 | 0 |
| 1 | 1 | 0 | 0 |
| 1 | 0 | 0 | 1 |
| III | | IV | |

The wiring of the switch of FIG. 1, and the selection of the windings to perform a read operation on one of the cores is shown in Table III. In order to formulate the write selection pattern, it is only necessary to keep the wiring the same and to take the complementary pattern of Table III. Therefore, only the read selection pattern is necessary to describe the matrix switch since the write selection pattern is the complement of the read pattern.

Further expansions for larger-size switches may be accomplished in a similar manner to provide the winding sense patterns, and the winding selection patterns. This may be done for an eight output magnetic switch, a sixteen output magnetic switch, etc.

The method of expansion shown with respect to Tables I, II and III is related to the operation of the logic circuits of the decoder which control the magnetic switch. If we start with the basic pattern in quadrant II of Table II, which corresponds to the 2 output-2 input pair (4 drivers) switch of Table I, the addition of quadrant III represents the addition of two more outputs, a total of four cores, and two more input pairs (8 drivers). Therefore, quadrants II and III represent a switch which selects a pair of outputs, i.e. one of the outputs is selected by the original pattern in quadrant II and the other selection occurs from the added outputs corresponding to quadrant III. Quadrants I and IV represent windings added to the cores to determine which output of the two outputs selected by the input pair windings of quadrants II and III is desired. This means that from the two outputs produced by quadrants II and III, only one will be selected by quadrants I and IV. If the quadrant I and quadrant IV inputs are pulsed the same as the quadrant II and quadrant III inputs, the single selected output is in quadrant I, which came from quadrant II. This occurs because quadrant I has the same selection pattern as quadrant II while quadrant IV has the complementary selection pattern of quadrant II. If pulsing complementary to that applied to quadrants II and III is applied to quadrants I and IV, the selected output would be the output of quadrants III and IV. Therefore, each expansion level chooses one output from each pair of outputs selected by the previous expansion level.

In order to select the proper core, a decoder must be provided which is capable of energizing the matrix switch drivers in the correct combinatorial pattern. The decoder preferably is constructed to operate in response to an address having $n$ bits of a binary nature. If the matrix switch has only four cores, as in FIG. 1, a two bit address ($n=2$) is required to select one of the four possible core outputs by energizing the proper drivers of each pair of the four driver pairs. An extra control signal, a read-write bit, is also provided. The read-write bit acts as a control signal which determines the driver of each pair which is pulsed during the read time and write time of a memory cycle for one selected core of the switch.

If the matrix switch is expanded so that sixteen magnetic cores are provided, sixteen driver pairs must also be provided in order that one core may be selected during a read or write operation. In this instance, for a sixteen output matrix switch, at least a four bit binary address ($n=4$) is required to select one of the sixteen possible outputs. The read-write bit control signal is also supplied to the decoder to determine which of the drivers of the pair to pulse during read time and write time. The present invention is concerned with a decoder which is used for performing this function. While a decoder for a sixteen output load sharing matrix switch using a particular type logic is described, it should be realized that decoders which utilize the principles of this invention with the same or different logic may be constructed for any size matrix switch.

When a sixteen output matrix switch is constructed, a read selection pattern, similar to that shown in Table III, may be formulated by the expansion method which is described with respect to Table II. This is accomplished by first doubling the size of the four output matrix switch of Table III into an eight output matrix switch and then doubling the size of the eight output matrix switch. The read selection pattern for a sixteen output matrix switch is shown below in Table IV.

*Table IV*

| Output Address | Inputs | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 15 | 1 | 1 | 1 | 1 | 1 | 1 | 1 | 1 | 1 | 1 | 1 | 1 | 1 | 1 | 1 | 1 |
| 14 | 1 | 0 | 1 | 0 | 1 | 0 | 1 | 0 | 1 | 0 | 1 | 0 | 1 | 0 | 1 | 0 |
| 13 | 1 | 1 | 0 | 0 | 1 | 1 | 0 | 0 | 1 | 1 | 0 | 0 | 1 | 1 | 0 | 0 |
| 12 | 1 | 0 | 0 | 1 | 1 | 0 | 0 | 1 | 1 | 0 | 0 | 1 | 1 | 0 | 0 | 1 |
| 11 | 1 | 1 | 1 | 1 | 0 | 0 | 0 | 0 | 1 | 1 | 1 | 1 | 0 | 0 | 0 | 0 |
| 10 | 1 | 0 | 1 | 0 | 0 | 1 | 0 | 1 | 1 | 0 | 1 | 0 | 0 | 1 | 0 | 1 |
| 9 | 1 | 1 | 0 | 0 | 0 | 0 | 1 | 1 | 1 | 1 | 0 | 0 | 0 | 0 | 1 | 1 |
| 8 | 1 | 0 | 0 | 1 | 0 | 1 | 1 | 0 | 1 | 0 | 0 | 1 | 0 | 1 | 1 | 0 |
| 7 | 1 | 1 | 1 | 1 | 1 | 1 | 1 | 1 | 0 | 0 | 0 | 0 | 0 | 0 | 0 | 0 |
| 6 | 1 | 0 | 1 | 0 | 1 | 0 | 1 | 0 | 0 | 1 | 0 | 1 | 0 | 1 | 0 | 1 |
| 5 | 1 | 1 | 0 | 0 | 1 | 1 | 0 | 0 | 0 | 0 | 1 | 1 | 0 | 0 | 1 | 1 |
| 4 | 1 | 0 | 0 | 1 | 1 | 0 | 0 | 1 | 0 | 1 | 1 | 0 | 0 | 1 | 1 | 0 |
| 3 | 1 | 1 | 1 | 1 | 0 | 0 | 0 | 0 | 0 | 0 | 0 | 0 | 1 | 1 | 1 | 1 |
| 2 | 1 | 0 | 1 | 0 | 0 | 1 | 0 | 1 | 0 | 1 | 0 | 1 | 1 | 0 | 1 | 0 |
| 1 | 1 | 1 | 0 | 0 | 0 | 0 | 1 | 1 | 0 | 0 | 1 | 1 | 1 | 1 | 0 | 0 |
| 0 | 1 | 0 | 0 | 1 | 0 | 1 | 1 | 0 | 0 | 1 | 1 | 0 | 1 | 0 | 0 | 1 |

In Table IV, the numbers 0–15 under the column labeled "Output Address" represent the core to be selected. This selection is determined by a four bit address plus a read-write address bit which is supplied to the decoder which determines whether the selected core is to perform a read or write operation. The top row, which is labeled 1–16, represents the sixteen driver pairs of the sixteen output load sharing matrix switch. The 1 underneath one of the input drivers represents that the driver connected to the normal winding of that pair is pulsed and a 0 represents that the driver connected to the complementary winding of that pair is pulsed. Upon supplying the decoder with the proper address bits, the decoder operates to energize the proper drivers so that any one of the sixteen cores may be selected for either a read or a write operation.

As can be seen from Table IV, the driver of driver pair No. 1, which is connected to the normal winding, is always pulsed during read time and the driver connected to the complementary winding is always pulsed during write time. It is always the case, with respect to any of the winding pairs, that the winding supplied with a current pulse from a driver during write time for a selected core is always the winding which was not supplied with a pulse during read time, i.e. the complementary driver of the pair is energized during write time. In the decoder of the present invention, a four bit address is used to generate a number of signals which are used to select which driver of each of the driver pairs is to be energized to perform a read operation on a selected core. The read-write bit is used as a control signal to make a final determination of whether the signals generated are used to select the correct driver of the pairs for a read operation or a write operation on the selected core.

Figure 2:
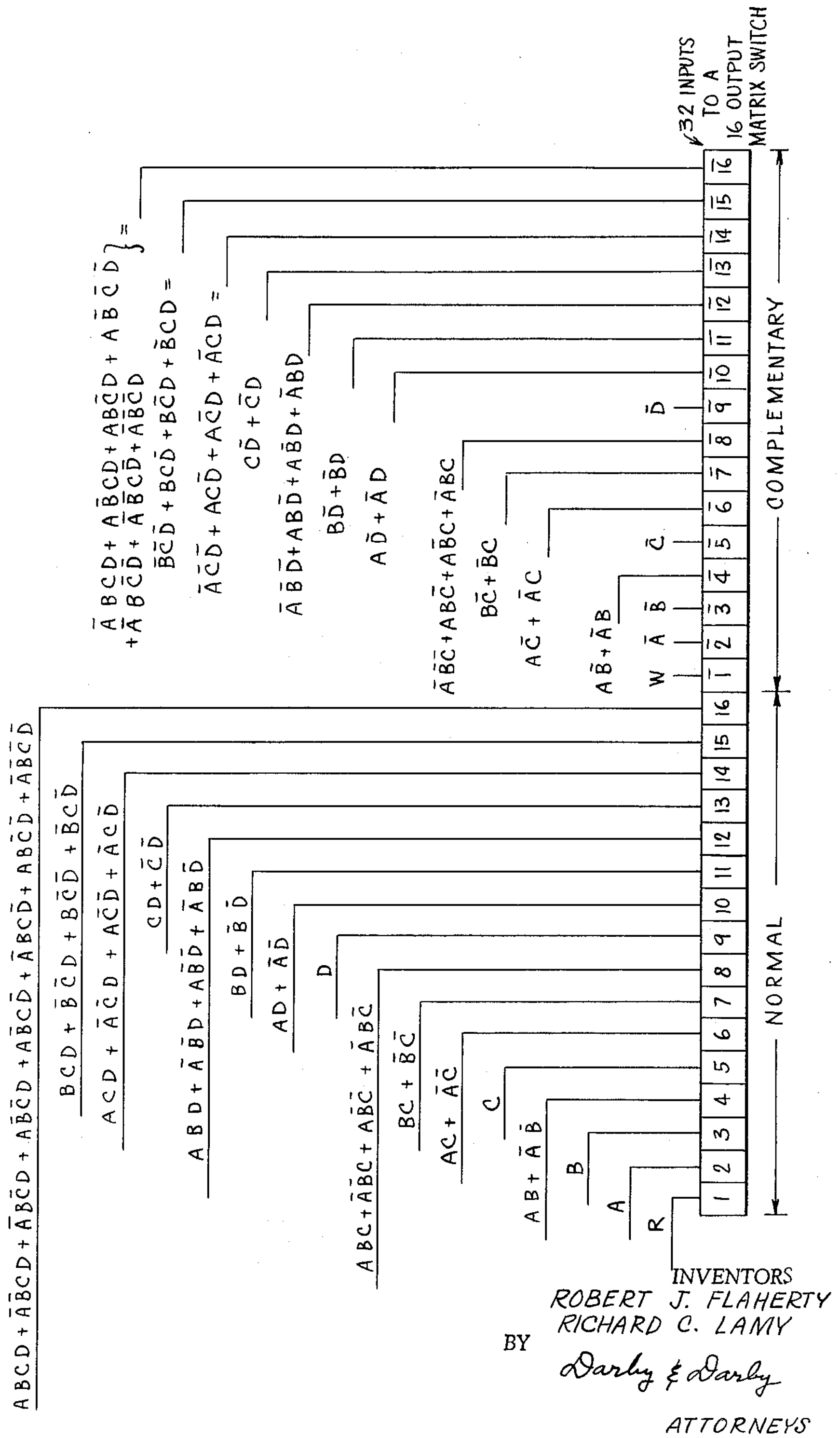
FIG. 2 shows typical logical functions which may be generated to select the proper drivers.

Referring to FIG. 2, a group of logical functions are shown which may be used to generate the signals used for energizing the drivers. These functions are developed by logical algebra techniques and are various combinations of true signals called A, B, C and D and their complementary signals called $\overline{A}$, $\overline{B}$, $\overline{C}$ and $\overline{D}$. The designation of a combination of two or more complementary signals together, e.g. $\overline{A}B$, $\overline{A}BC$, $\overline{A}B\overline{C}D$ signifies an "and" function while the plus sign (+) signifies an "or" function. Both of these functions as well as the logical algebra technique are well known in the computation art and need no further description.

The drivers which are connected to the normal windings of the winding pairs are designated 1, 2, 3 . . . 16 while the drivers which are connected to the complementary windings of these same winding pairs are designated $\overline{\mathbf{1}}$, $\overline{\mathbf{2}}$, $\overline{\mathbf{3}}$ . . . $\overline{\mathbf{16}}$. When any one of the functions shown for a particular driver is generated by the decoder logical circuits, that driver is energized. The production of the combinations of true and complementary signals is performed by suitably connected logical circuits, which will be described later, and initially determined by a four bit binary address which is supplied from an external source.

In response to any four bit address, in combination with the read-write bit which also determines whether a read or a write operation is to be performed on the selected core and a timing signal, sixteen of the thirty-two drivers are energized and the windings connected to these drivers receive drive current pulses.

Figure 3:
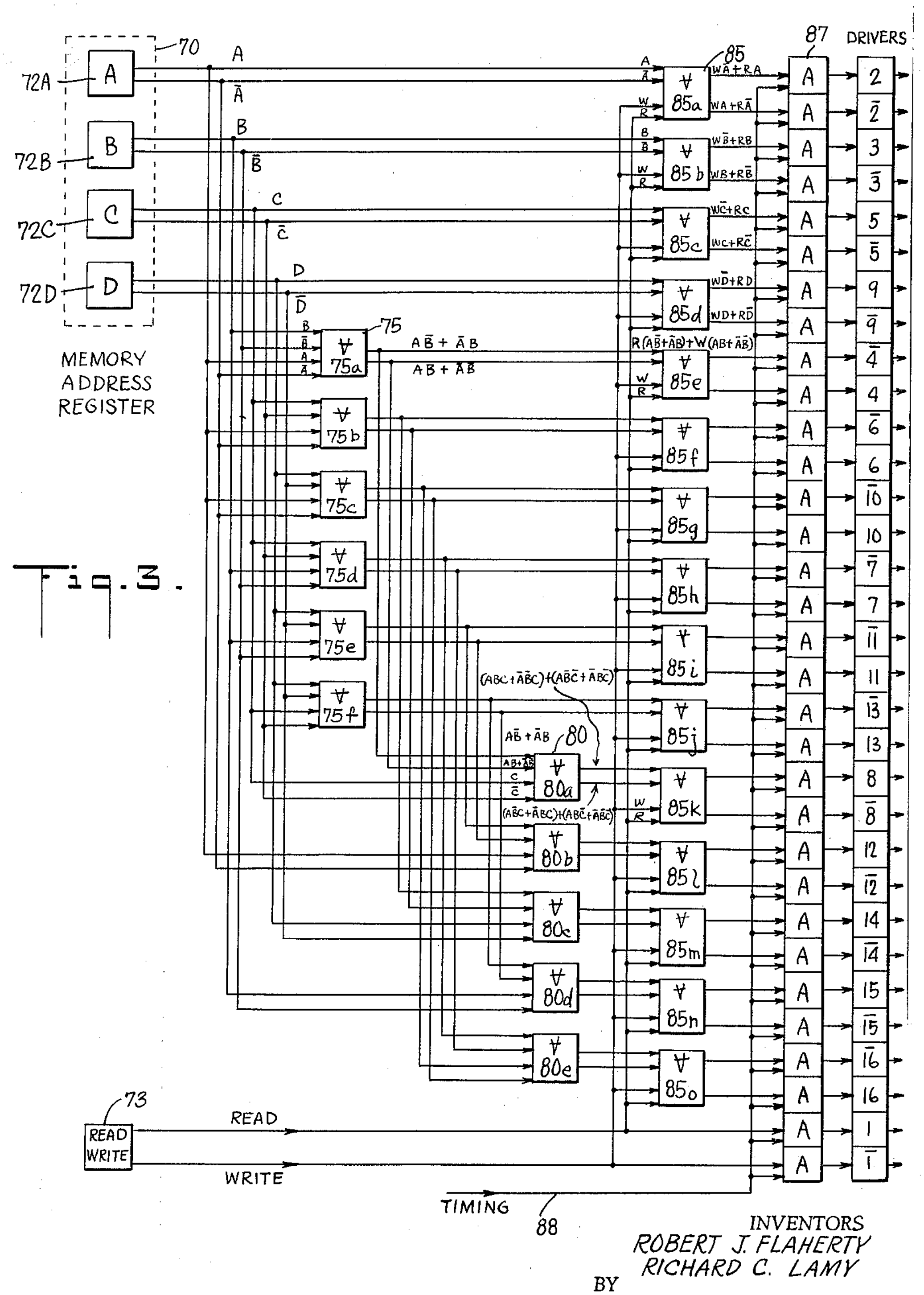
FIG. 3 is a diagrammatic representation of the decoder of the present invention.

FIG. 3 is a schematic representation of the logical circuitry which may be used to generate the logical functions shown in FIG. 2 necessary to produce the signals for the energization of the proper drivers for selecting a core. The logical circuits of FIG. 3 operate in response to a four bit address and a signal which controls the production of the read-write bit. Referring to FIG. 3, a memory address or main address register 70 is formed by four bistable triggers 72A, 72B, 72C and 72D which are shown within the dotted block. Each of the triggers 72 produces a signal on its respective true output line A, B, C or D or complementary output line $\overline{A}$, $\overline{B}$, $\overline{C}$ or $\overline{D}$ in response to a binary input address signal. In a preferred embodiment of the invention, each trigger 72 produces a signal on its true signal output line in response to a binary 1 input address and produces a signal on its complementary signal output line in response to a binary 0 address. If desired, the reverse arrangement may be used. A read-write trigger 73 is also provided for producing the read-write bit. This trigger also preferably operates in response to a binary input control signal and produces a signal on the read output line in response to a binary 1 input signal while producing a signal on the write output line in response to a binary 0 input signal. Each of the triggers 72 and 73 may be of the well-known bistable flip-flop types and may be either of a suitable vacuum tube or transistor type.

The driver pairs are again designated as 1–$\overline{\mathbf{1}}$, 2–$\overline{\mathbf{2}}$, 3–$\overline{\mathbf{3}}$ . . . 16–$\overline{\mathbf{16}}$. Located between the drivers and the memory address register 70 are three levels of logical circuits 75, 80 and 85, which in the preferred form of the invention herein described are "exclusive or" circuits, and are designated by the symbol "*v*." In response to the true and complementary signals produced by triggers 72A–72D, the first two levels 75 and 80 of "exclusive or" circuits generate certain ones of the combination functions shown in FIG. 2. These combination functions control the energization of the driver pairs 4–$\overline{\mathbf{4}}$, 6–$\overline{\mathbf{6}}$, 7–$\overline{\mathbf{7}}$, 8–$\overline{\mathbf{8}}$, 10–$\overline{\mathbf{10}}$, 11–$\overline{\mathbf{11}}$, 12–$\overline{\mathbf{12}}$, 13–$\overline{\mathbf{13}}$, 14–$\overline{\mathbf{14}}$, 15–$\overline{\mathbf{15}}$ and 16–$\overline{\mathbf{16}}$. The true and complementary signals produced by the triggers 72A–72D and the read-write bit control signal also directly control the remainder of the driver pairs.

In a preferred mode of operation, the circuits 72, 73, 75 and 80 develop the read selection pattern necessary for the energization of the proper drivers for the selection of any core of the matrix switch. The third level "exclusive or" circuits 85 operates in response to the read-write bit control signal to determine whether the read selection pattern is to be used to perform a read or a write operation on the selected core. By switching the output of the trigger 73 from the read to the write output line, the driver of each pair which was non-energized during one operation (e.g., read) on a core is energized for the other operation (e.g., write) on the same core. It can be seen that the true and complementary signals produced by the main address register 70, and the logical circuits 75 and 80, which operate in response to these signals, in combination with the true and complementary signals produced by the read-write trigger determine the winding selection pattern of Table IV for selecting a particular core for a read or write operation.

The triggers 72A–72D are connected to the circuits 75 and 80 in the following manner: the true and complementary signal output lines from the trigger 72A are connected in parallel to the inputs of the first-level "exclusive or" circuits 75*a*, 75*b*, and 75*c* and "exclusive or" circuit 80*b* in the second level. The output lines of trigger 72B are connected to the inputs of "exclusive or" circuits 75*a*, 75*d*, 75*e*, and 80*d*. The output lines of the trigger 72*c* are connected to the inputs of "exclusive or" circuits 75*b*, 75*d*, 75*f*, and 80*a*. The output lines of the trigger 72D are connected to "exclusive or" circuits 75*c*, 75*e*, 75*f* and 80*c*.

Any one of the "exclusive or" circuits 75 produces an output signal on its upper or its lower line in accordance with the input signals which are applied. For example, circuit 75*a* produces an output on its upper line when it receives an input on signal lines A and $\overline{B}$, or $\overline{A}$ and B and produces an output on its lower line upon receipt of input signals on lines A and B or $\overline{A}$ and $\overline{B}$. The operation of each of the "exclusive or" circuits 75, 80 and 85 is similar and is explained by referring to FIG. 4, which by way of illustration is shown as receiving the signals which are applied to "exclusive or" circuit 75*a*.

Figure 4:
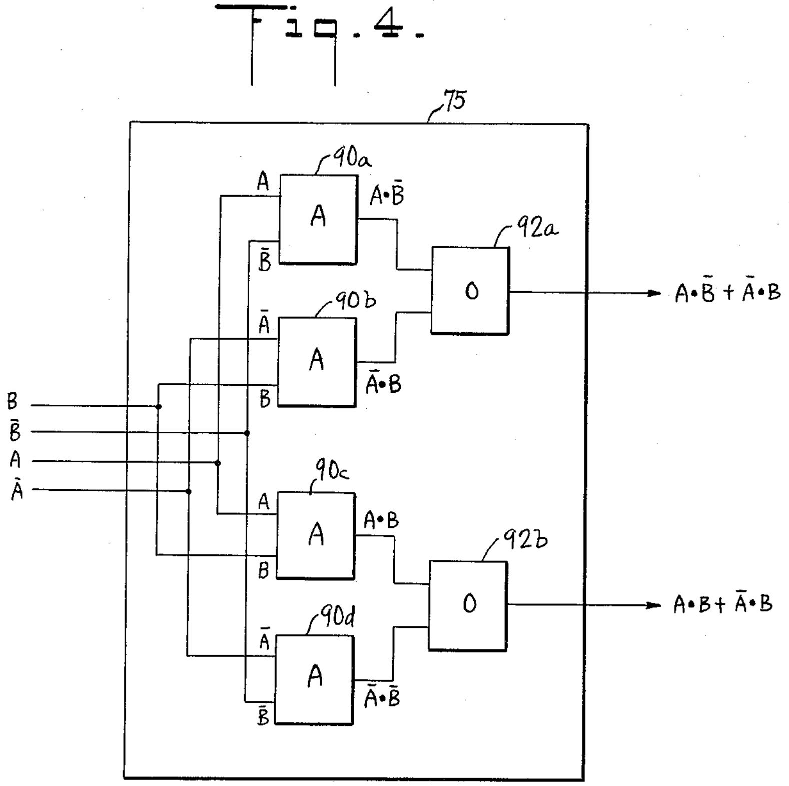
FIG. 4 is a diagrammatic representation of a typical "exclusive or" circuit used in the present invention.

Referring to FIG. 4, the "exclusive or" circuit is shown as formed by four "and" circuits 90 and two "or" circuits 92. The input to the circuits is over four lines B, $\overline{B}$, A, and $\overline{A}$ which carry their respective signals. The B signal line is one input for each of the "and" circuits 90*b* and 90*c*; the $\overline{B}$ line is connected to one input of each of "and" circuits 90*a* and 90*d*; the A line is connected to one input of each of "and" circuits 90*a* and 90*c*; and the $\overline{A}$ line is connected to each of the inputs of "and" circuits 90*b* and 90*d*. The operation of the "and" circuits 90 is well known, namely, there must be a binary 1 signal on both input lines before an output 1 signal is produced. For example, circuit 90*a* generates an output 1 signal only when 1 signals are present on the A and $\overline{B}$ input lines. The input signals necessary to produce an output signal are shown on the output line of each "and" circuit of FIG. 4.

The output lines of the two adjacent "and" circuits 90*a* and 90*b* are connected to an "or" circuit 92*a* and the outputs of the "and" circuits 90*c* and 90*d* connected to the inputs of "or" circuit 92*b*. As is well known, an "or" circuit produces a signal on its output line when a signal is present on either one of its input lines. Therefore, the output line of the "or" circuit has an output signal present on it when either one of the "and" circuits connected to it produces a signal on its output line.

To illustrate the operation of the "exclusive or" circuit, consider the case where lines $\overline{A}$ and $\overline{B}$ have signals present and the lines A and B have no signals, i.e. signals present only on the false assertion lines of triggers 72A and 72B. Under these conditions, there is no output from "and" circuits 90*a* or 90*b*, since the A and B lines have a 0 signal, and therefore no output from the "or" circuit 92*a*. There is no output from "and" circuit 90*c* since both the A and B lines have a 0 signal. The signals on line $\overline{A}$ and $\overline{B}$ produce an output signal from "and" circuit 90*d*, and hence an output is produced by "or" circuit 92*b* which corresponds to the input signals on lines $\overline{A}$ and $\overline{B}$. In this manner, signals may be produced on either the upper or the lower output lines of the "exclusive or" circuits. All of the "exclusive or" circuits used may be formed by suitable circuit elements such as diodes, vacuum tubes or transistors. When transistors are used, for the "exclusive or," triggers and drivers, the proper coupling circuitry should be provided to couple two circuits of opposite conductivity transistor types.

Signals are produced on the upper or lower output lines of the "exclusive or" circuits 75 in response to the following functions, which are generated as a result of the signals supplied by the triggers 72. The plus signal (+) signifies an "or" function, meaning that signals are produced in response to one or the other of the functions.

| "Exclusive or" Circuit | Output | |
|---|---|---|
| | Upper Line | Lower Line |
| 75*a* | $A\overline{B}+\overline{A}B$ | $AB+\overline{AB}$ |
| 75*b* | $A\overline{C}+\overline{A}C$ | $AC+\overline{AC}$ |
| 75*c* | $A\overline{D}+\overline{A}D$ | $AD+\overline{AD}$ |
| 75*d* | $B\overline{C}+\overline{B}C$ | $BC+\overline{BC}$ |
| 75*e* | $B\overline{D}+\overline{B}D$ | $BD+\overline{BD}$ |
| 75*f* | $C\overline{D}+\overline{C}D$ | $CD+\overline{CD}$ |

The "exclusive or" circuits 80 are connected as follows. The upper and lower output lines of the "exclusive or" circuits 75 of the first level and the output lines of the triggers 72 are connected to the "exclusive or" circuits 80 of the second level in the following manner. The output lines from circuit 75*a* and trigger 72C are the input lines for circuit 80*a* while the output lines from circuits 75*e* and trigger 72A are the input lines for circuit 80*b*. Circuit 80*c* has its inputs connected to the output lines of circuit 75*b* and trigger 72D while cirrcuit 82*d* has its inputs connected to the output lines of circuit 75F and trigger 72B. The "exclusive or" circuit 80*d* has its inputs connected to the output lines of two first level "exclusive or" circuits 75*c* and 75*d*. The "exclusive or" circuits 80 operate in a manner which is similar to that described for the circuit shown in FIG. 4. However, in this case, at least one of the inputs of the circuit is derived from a prior "exclusive or" operation performed by the first level circuits 75. Signals are therefore produced on the upper or lower output lines of the "exclusive or" circuits 80 is response to combination of signals on the output lines of three or more of the triggers 72A–72D. These combination are listed below.

| "Exclusive or" | Output | |
| --- | --- | --- |
| | Upper Line | Lower Line |
| Circuit: | | |
| 80*a* | $A\overline{B}\overline{C}+\overline{A}B\overline{C}+\overline{A}\overline{B}\overline{C}+ABC$ | $\overline{A}\overline{B}\overline{C}+AB\overline{C}+A\overline{B}C+\overline{A}BC$ |
| 80*b* | $A\overline{B}\overline{D}+\overline{A}B\overline{D}+\overline{A}\overline{B}D+ABD$ | $\overline{A}BD+A\overline{B}D+AB\overline{D}+\overline{A}\overline{B}\overline{D}$ |
| 80*c* | $B\overline{C}\overline{D}+\overline{B}C\overline{D}+\overline{B}\overline{C}D+BCD$ | $\overline{B}CD+B\overline{C}D+BC\overline{D}+\overline{B}\overline{C}\overline{D}$ |
| 80*d* | $A\overline{B}\overline{C}\overline{D}+\overline{A}B\overline{C}D+\overline{A}\overline{B}C\overline{D}$ $+ABCD+\overline{A}\overline{B}\overline{C}D+A\overline{B}\overline{C}D$ $+A\overline{B}CD+\overline{A}B\overline{C}D$ | $\overline{A}BCD+A\overline{B}C\overline{D}+AB\overline{C}D$ $+\overline{A}\overline{B}\overline{C}\overline{D}+ABC\overline{D}+\overline{A}BC\overline{D}$ $+\overline{A}B\overline{C}\overline{D}+AB\overline{C}\overline{D}$ |

The third level "exclusive or" circuits 85 are used to control the energization of the driver pairs 2–$\overline{\mathbf{2}}$ . . . 16–$\overline{\mathbf{16}}$, in response to the receipt of signals on the upper or lower output lines of the triggers 72, the "exclusive or" circuits 75 and 80 and read-write bit signal. Each of the "exclusive or" circuits 85*a*–85*o* has two output lines. Each of the output lines of the circuits 85 is connected to one driver of a driver pair through an "and" circuit 87. The inputs of the "and" circuits 87 all receive timing pulses over line 88 which originate in the computer timing circuits. The timing pulses ensure that all the drivers are simultaneously energized. The "and" circuits 87, may also serve as repowering amplifiers and generate a pulse sufficient to energize its connected driver in response to the low power signal which appears on the output line of the "exclusive or" circuit 85.

When a signal appears on one of the output lines of the "exclusive or" circuits 85, the driver which is connected to it is energized at the appropriate time when a timing signal is applied to the corresponding "and" circuit 87. If the drivers are PNP transistors and the signal produced on the output lines is of positive polarity, the output lines would be connected (through the "and" circuits 87) to the emitter electrodes of the transistor. Suitable connections would be made for vacuum tubes, other types of transistors, etc. Upon energization of a driver, a pulse of current is produced on its connected winding.

The output line of the "exclusive or" circuit 85 on which a signal is produced is determined by the input address supplied to the triggers 72 and the read-write trigger 73 and the signals generated by circuits 75 and 80. As can be seen in FIG. 3, the output lines of the triggers 72A–72D are respectively connected to the inputs of circuits 85*a*–85*d*, and these circuits 85*a*–85*d*, through their connected "and" circuits 87, control driver pairs 2–$\overline{\mathbf{2}}$, 3–$\overline{\mathbf{3}}$, 5–$\overline{\mathbf{5}}$ and 9–$\overline{\mathbf{9}}$. The output lines of "exclusive or" circuits 75*a*–75*f* are respectively connected to the inputs of circuits 85*e*–85*j* which control the respective driver pairs 4–$\overline{\mathbf{4}}$, 6–$\overline{\mathbf{6}}$, 10–$\overline{\mathbf{10}}$, 7–$\overline{\mathbf{7}}$, 11–$\overline{\mathbf{11}}$, and 13–$\overline{\mathbf{13}}$. The output lines of "exclusive or" circuits 80*a*–80*e* are respectively connected to the inputs of "exclusive or" circuits 85*k*–85*o* which control the respective driver pairs 8–$\overline{\mathbf{8}}$, 12–$\overline{\mathbf{12}}$, 14–$\overline{\mathbf{14}}$, 15–$\overline{\mathbf{15}}$ and 16–$\overline{\mathbf{16}}$. The read and write output lines of the read-write trigger 73 are connected to and control the driver pair 1–$\overline{\mathbf{1}}$. In this manner the energization of one of the drivers of each of the driver pairs 1–$\overline{\mathbf{1}}$ . . . 16–$\overline{\mathbf{16}}$ is controlled by an "exclusive or" circuit 85 and the read-write trigger 73.

Each of the "exclusive or" circuits 85*a*–85*o* also has one of its other inputs connected to the read signal output line of the trigger 73 and another of its input to the write signal output line of the trigger 73. The signals on the read and write output lines determine whether a signal is to be produced on the upper or lower output lines of the "exclusive or" currents 85. Circuits 85 are similar to the "exclusive or" circuits described in FIG. 4. For input signals on the read or the write lines and on one of the other two input lines, the "exclusive or" circuit 85 produces an output signal on its upper or lower output line, thereby energizing the driver connected to it. For example, if it is desired to energize driver $\overline{\mathbf{2}}$ (the driver connected to the lower output line of circuit 85*a*) signals are applied to circuit 85*a* via the $\overline{A}$ line and the read line. These signals result in the "exclusive or" circuit 85*a* producing a signal on its lower line, thereby energizing driver $\overline{\mathbf{2}}$. If it is desired to energize driver 2 with the signal are applied to circuit 85*a* via the A line and the read line. still being present on the $\overline{A}$ line, it is only necessary to put a signal on the write line instead of the read line. This produces a signal on the upper output line of circuit 85*a* thereby energizing driver 2. In a similar manner, either driver of a driver pair may be energized under the control of the signal on the read or write line, without changing the other input signal.

In operation, the read-write bit is used as a control signal. When a signal is produced on the read output line, the "exclusive or" circuits 85 are so conditioned so that the drivers necessary to perform a read operation on a selected core are energized. When it is desired to perform a write operation on the same core, it is only necessary to remove the signal from the read line and place it on the write line. The circuits 72, 75 and 80, preceding the circuits 85, are used to produce true and complementary signals and combinations thereof and to place these signals on the proper input lines of the circuits 85 so that a read operation may be performed on a selected core. If there were no circuits 85 and the output lines of circuits 72, 75 and 80 directly controlled the drivers, the proper driver of each pair would be energized to perform a read operation on the selected core. The circuits 85 determine, in response to the read-write bit control signal, whether a read or a write operation is to be performed. If a signal is present on the read line, the read selection pattern, as produced by circuits 72, 75 and 80, is utilized in a manner such that the circuits 85 in effect allow the direct control of the drivers to be established. When a signal is placed on the write line however, the circuits 85 serve to switch the read selection pattern to a write selection pattern by producing the signal on the output line which is not used during a read operation on a selected core. Stated another way, the read-write bit determine whether true or complementary signals of the read selection-pattern produced by circuits 72, 75 and 80 are to be obtained. In this manner, under the control of the read-write bit, the complementary drivers of the pairs, those drivers which are not energized during a read operation on a selected core, are energized during a write operation.

To illustrate the operation of the decoder, consider an illustrative example wherein the core 12 is to be selected for a read operation. Referring to Table IV and FIG. 2, the drivers and the logical functions needed to produce energization of these drivers, for the selection of core 12 are shown. In order to select core 12, an address of 1 1 0 0 (binary 12) is fed into the respective triggers 72D, 72C, 72B and 72A. Since a read operation is to be performed, a binary 1 is fed into the read-write trigger 73. In response to this address, signals are produced on lines $\overline{A}$, $\overline{B}$, C and D, and the read line. The signal on the $\overline{A}$ line and the signal on read line combine in "exclusive or" circuit 85*a* to produce a signal on the bottom line of the circuit which is connected to driver $\overline{\mathbf{2}}$, and hence energizes driver $\overline{\mathbf{2}}$. Similar operations occur in "exclusive or" circuits 85*b*, 85*c*, and 85*d*, and signals are produced on the proper output lines of these circuits to energize drivers $\overline{\mathbf{3}}$ and 5 and 9.

The signals which are produced at the outputs of circuits 75*a*–75*f*, in response to the true and false signals $\overline{A}$, $\overline{B}$, C, D, are mixed in the "exclusive or" circuits 85*e*–85*j* with the signal applied via the read line. The output signals of circuits 85*e*–85*j* appear on the proper output lines of these circuits to energize respective drivers 4, $\overline{\mathbf{6}}$, $\overline{\mathbf{10}}$, $\overline{\mathbf{7}}$, $\overline{\mathbf{11}}$, and 13 via the appropriate "and" circuits 87.

The signals produced at the outputs of "exclusive or" circuits 80*a*–80*e* combine with the signal on the read line in the circuits 85*k*–85*o*. The signals at the outputs of these circuits energize respective drivers 8, 12, $\overline{\mathbf{14}}$, $\overline{\mathbf{15}}$ and $\overline{\mathbf{16}}$ via the appropriate "and" circuits 87. Driver 1 is energized by the read bit directly. In this manner, the proper driver of each of the 16 driver pairs is energized. The current pulses produced by the energized drivers on their connected windings combine and perform a read operation on core 12.

If it is desired to perform a write operation on core 12, the same address bits are applied so that the true and false signals are produced by the triggers 72A–72D on the $\overline{A}$, $\overline{B}$, C and D lines. Circuits 75 and 80 operate to produce signals on the same output lines as if a read operation were to be performed and signals are applied to the same input lines of circuits 85*a*–85*o*. However, in this case, the trigger 73 is operated to produce an output on the write line to form the complementary pattern of the read selection pattern generated in response to the true and false address signals. The signal on the write line switches the outputs of the "exclusive or" circuits 85*a*–85*o* to the opposite line from which the output appeared during the read operation. In this manner, the complementary driver of the pair is selected and energized for the write operation.

In a manner similar to the one described, any one of the cores of the matrix switch may be selected for a read or a write operation. All that is necessary is that the proper address be supplied to the memory address register 70 so that the "exclusive or" circuits 75, 80 and 85 produce signals to energize the proper drivers for a read operation of a core. The read-write bit is then used to determine whether a read or a write operation is to be performed.

It should be realized that the circuits 72, 75 and 80 may be constructed so that signals for a write selection pattern are generated in response to the input address. In this case, the read-write bit would control the circuits 85 so that true or complementary patterns of these generated signals are produced as desired.

Utilizing the principles of the present invention, it is also possible to construct decoders which use logical functions and selection patterns other than the ones described. For example, it may be desired to construct a matrix switch wherein the winding pattern were such that the switching of a core is controlled not by current supplied from one driver for each of the driver pairs but by current from one driver of some of the pairs, two drivers from other pairs and no drivers from the remaining pairs. The energized drivers would not necessarily be adjacent, i.e., 1–$\overline{\mathbf{1}}$ to 8–$\overline{\mathbf{8}}$. In this case, the selection pattern generated by the logical circuits would provide signals to energize half of the total number of drivers. In response to a control signal on the read line, these signals energize the proper half of the drivers for a read operation on the chosen core and the remaining half of the drivers, which were non-energized are energized in response to a signal on the write line to perform a write operation on the same core. This arrangement has the advantage of being able to operate a load-sharing matrix switch with 32 drivers so that more than 16 outputs are produced.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A decoder for a load sharing matrix switch adapted for energizing a selected driver of each of a plurality of driver pairs in response to a unique pattern of signals, said decoder comprising: means for producing pattern designating signals, a plurality of pairs of drivers, means responsive to said pattern designating signals for generating said unique pattern of signals for energizing the selected driver of each pair, control means connected between said signal pattern generating means and said pairs of drivers, means connected to said control means for producing first and second control signals, said control means being responsive to said first control signal and said unique pattern of signals for reproducing said unique pattern of signals to energize a selected driver of each pair, and said control means being responsive to said second control signal and said unique pattern of signals for producing the complement of said unique pattern of signals to energize the other driver of each driver pair.

2. A decoder for operating a load sharing matrix switch formed by a plurality of switching elements having two stable states of operation, each switching element of the matrix switch having a plurality of pairs of energizing windings coupled thereto for switching only one of said switching elements to one of said two stable states upon energization of a selected winding in each of the winding pairs said decoder comprising: a plurality of pairs of drivers, means for connecting one driver in each driver pair to one of said windings of a said winding pair and the other driver of each driver pair to the other winding of a corresponding winding pair, each of said drivers upon energization supplying current to its respectively connected winding to contribute to the switching of a selected switching element to its desired state, control means connected to said driver pairs, means for producing address signals, means connected to said control means and to said address signal producing means and responsive to said address signals for producing a unique pattern of signals for energizing a selected driver of each pair for switching a selected switching element into a selected one of said stable states of operation, means connected to said control means for producing first and second control signals, said control means being responsive to said first control signal and said unique pattern of signals for reproducing the unique pattern of signals for energizing the proper driver of each driver pair for switching said selected switching element into said selected one stable state and responsive to said second control signal and said unique pattern of signals for producing the complement of the unique pattern of signals for energizing the other driver of each driver pair for switching said selected element to the other of said two stable states.

3. A decoder for a load sharing matrix switch for selectively controlling the state of a selected switching element of said matrix switch by the energization of a selected driver in each of a plurality of pairs of drivers which are connected to said switch, said decoder comprising: a plurality of pairs of drivers, first means for generating a first group of predetermined true and complementary signals, second means connected to said first means and responsive to said first group of signals for producing a second group of signals representative of predetermined combinations of said first group of true and complementary signals, said first and second groups of true, complementary and combination signals being representative of one driver of each driver pair to be energized, a plurality of control means connected to said first and second means, means for connecting each of said control means to the drivers of a respective driver pair, means connected to said control means for selectively producing first and second control signals for application to said plurality of control means, said plurality of control means being responsive to said first and second groups of said true, complementary and combination signals and said first control signal to energize a selected one driver of each driver pair and responsive to said first and second groups of said true, complementary and combination signals and said second control signal to energize the other driver of each of the driver pairs.

4. A decoder as set forth in claim 3 wherein said plurality of said second means and said control means are EXCLUSIVE OR circuits.

5. A decoder for a load sharing matrix switch for selectively controlling the state of a selected switching element of said matrix switch by the energization of a selected driver in each of a plurality of driver pairs, said decoder comprising: a plurality of pairs of drivers, first means for generating a first group of predetermined true and complementary signals, a plurality of second means connected to said first means and responsive to selected ones of said first group of signals for producing a second group of signals representative of predetermined combinations of said true and complementary signals of said first group, said true, complementary and combination signals of said first and second groups being representative of one driver of each driver pair to be energized, a plurality of control means connected to said first and second means, each of said control means having two output lines, means for connecting each of said output lines to a respective driver of a respective driver pair, means connected to said plurality of control means for selectively producing first and second control signals for application to said control means, said control means being responsive to said true, complementary and combination signals of said first and second groups and said first control signal for producing a given signal on one of the output lines of each of the control means for energizing the one driver of each pair connected to said one line, and said control means being responsive to said true, complementary and combination signals of said first and second groups and said second control signal for producing a given signal on the other output line of each of the control means for energizing the other driver of each driver pair connected to said other line.

6. In a switching arrangement for a driver matrix of the type in which each driver has two conditions of stability, selection of a driver being effected upon energization of a pattern of load sharing circuits unique to the driver, each of the load sharing circuits being interconnected to a corresponding one of a plurality of matrix input lines, the combination comprising: means for supplying pattern designating signals; a translator connected to the pattern designating signal producing means and operable in response to the reception of a pattern designating signal for conditionally selecting for energization an appropriate pattern of load sharing circuits unique to the selection of a particular driver; a plurality of pairs of switching means connected to said translator means with each switching means having its output connected to a corresponding one of said matrix input lines and providing an energizing signal on the connected matrix line upon being energized by said translator means; and a translator switching means having two switching operations connected to said translator means, the first switching operation causing the translator means to energize one of each pair of the switching means and the corresponding load sharing circuits in the conditioned pattern to cause the associated driver to assume a second condition of stability, the second switching operation causing the translator means to energize the remaining switching means and the corresponding remaining load sharing circuits in the conditioned pattern to cause the associated driver to assume a first condition of stability.

References Cited by the Examiner

UNITED STATES PATENTS

| | | | |
|---|---|---|---|
| 2,813,259 | 11/57 | Burkhart | 340—174.1 |
| 2,890,830 | 6/59 | Wood-Hill | 235—174 |
| 2,920,823 | 1/60 | Gallichotte | 235—173 |
| 2,991,454 | 7/61 | Hammer | 340—166 X |

OTHER REFERENCES

"Arithmetic Operations in Digital Computers," by Richards, pp. 34, 35, 73 and 126, published by Van Nostrand, 1955.

"Basics of Digital Computers," by J. Murphy, John F. Rider publisher, June 1958, vol. 2, page 12 relied on.

NEIL C. READ, *Primary Examiner.*

EVERETT R. REYNOLDS, IRVING SRAGOW, *Examiners.*